US006969928B2

(12) United States Patent
Hanson

(10) Patent No.: US 6,969,928 B2
(45) Date of Patent: Nov. 29, 2005

(54) MAGNETIC PROXIMITY INTERFACE CONTROL

(75) Inventor: George E. Hanson, Andover, KS (US)

(73) Assignee: LSI Logic Corporation, Milpitas, CA (US)

( * ) Notice: Subject to any disclaimer, the term of this patent is extended or adjusted under 35 U.S.C. 154(b) by 492 days.

(21) Appl. No.: 10/161,478

(22) Filed: May 31, 2002

(65) Prior Publication Data

US 2003/0225947 A1    Dec. 4, 2003

(51) Int. Cl.[7] .......................................... H02H 3/033
(52) U.S. Cl. ...................................... 307/328; 307/326
(58) Field of Search ........................ 361/759; 307/116, 307/134, 326, 329

(56) References Cited

U.S. PATENT DOCUMENTS

| | | | | |
|---|---|---|---|---|
| 4,396,880 A | * | 8/1983 | Windebank | 320/156 |
| 4,878,164 A | * | 10/1989 | Colombo | 363/49 |
| 6,373,229 B1 | * | 4/2002 | Slusky | 340/636.2 |
| 6,407,335 B1 | * | 6/2002 | Franklin-Lees et al. | 174/58 |
| 6,433,445 B1 | * | 8/2002 | Ahladas et al. | 307/117 |
| 6,534,951 B2 | * | 3/2003 | Kawashima | 320/107 |
| 6,615,301 B1 | * | 9/2003 | Lee et al. | 710/106 |
| 6,618,264 B2 | * | 9/2003 | Megason et al. | 361/759 |
| 2003/0154338 A1 | * | 8/2003 | Boz et al. | 710/303 |

* cited by examiner

Primary Examiner—Robert L. DeBeradinis
(74) Attorney, Agent, or Firm—Cochran Freund & Young LLC

(57) ABSTRACT

Disclosed is a system and method employing a magnetic proximity switch to enable the transfer of power between a power supply unit and a docking unit or to transfer data between a docking unit and a peripheral module such as a disk drive or controller module. Power may be transferred through the switch, or a signal from the switch may be employed to enable a control circuit. The control circuit may control a plurality of voltages or currents and may ramp voltages or currents to limit surge current when a module is installed or removed. The control unit may also be employed to place data and control signals in a high impedance state when a module is not docked, limiting electromagnetic radiation.

7 Claims, 6 Drawing Sheets

MAGNETIC PROXIMITY INTERFACE CONTROL

BACKGROUND OF THE INVENTION a. Field of the Invention

The present invention pertains to computer interface control and more specifically to a system and method employing magnetic proximity detection to enable or disable an interface.

b. Description of the Background

Storage systems typically comprise an array of disk drives, disk drive controllers, power supplies and interface cabling. Systems are often redundant in that there are duplicate controllers, duplicate power supplies and duplicate buses interconnecting controllers, drive arrays, and power supplies. Further, systems are often constructed to be readily maintainable and upgradeable. Various components of the system may be replaced while the system continues to operate. For example, if a power supply failure occurs, the failed power supply may be replaced while the system continues to operate using another functioning power supply or power supplies. Similarly, if a controller fails, the system may continue to operate using another functioning controller while the failed unit is replaced. These capabilities are often realized through a modular architecture. Typically, various modules comprising disk drives, controllers, power supplies and such, are disposed in a single cabinet or housing. The cabinet provides connections between the various modules, including detection of the presence of modules. The cabinets and associated modules must meet federal requirements for safety and electromagnetic radiation. Each opening in the cabinet, such as is required for connectors, presents a potential safety hazard if high voltages are present, and also presents an opportunity for electromagnetic radiation to escape the cabinet. Further, the insertion and removal of components may result in spikes or distortion to power supply voltages and data and control signals. Installation of a module may result in a momentary current surge as the module powers up. Some systems employ a 'bay' architecture into which modules may be inserted, wherein power signals are typically at the back of the bay and are less likely to be touched by personnel. Safety switches may be employed to limit exposure to harmful voltages, but such switches present a point of failure and may degrade after repeated insertions due to switching high current. Further, these systems do not address potential problems of power spikes and current surges that may affect system operation and may reduce module operating life. Therefore a new system and method for controlling interfaces in component architectures is needed.

SUMMARY OF THE INVENTION

The present invention overcomes the disadvantages and limitations of the prior art by providing a magnetic proximity controlled interface that enables signals in response to the presence of a magnetic field. The present invention may be employed to control interfaces for both power and data/control signals. By not driving an interface connector when a module is not present, electromagnetic radiation may be reduced. The present invention may also reduce the number of pins required in connectors by employing the magnetic proximity controlled interface to signal that a module is present rather than employing a signal pin in a connector.

The present invention therefore may comprise a method for removably connecting a power supply module to a docking unit in an electrical system comprising: producing a signal from a switch disposed in the docking unit when the power supply module is docked to the docking unit wherein the switch is responsive to a magnetic field produced by a magnet affixed to the power supply module; inputting the signal to a power control circuit; transferring a first voltage from the power control circuit to the power supply module when the signal is active; inhibiting transfer of the first voltage from the power control circuit to the power supply module when the signal is not active; and transferring a second voltage from the power supply module to the docking unit.

The invention may further comprise a method for removably connecting a storage system module to a docking unit in an electrical system comprising: producing a signal from a switch disposed in the docking unit when the storage system module is docked to the docking unit wherein the switch is responsive to a magnetic field produced by a magnet affixed to the storage system module; inputting the signal to a power control circuit; transferring a first voltage from the power control circuit to the storage system module when the signal is active; inhibiting transfer of the first voltage from the power control circuit to the storage system module when the signal is not active; enabling data signals connecting the storage system module and the docking unit when the signal is active; and placing the data signals in a high impedance state when the signal is not active.

The present invention may additionally comprise an electrical connection system comprising: a cabinet including at least one docking unit; a module that may be docked to the docking unit; a non-magnetic area in a portion of at least one surface of the docking unit; a magnet affixed to the module; a switch disposed in the non-magnetic area of the docking unit; and a circuit that receives a switch signal from the switch and that transfers a voltage from the docking unit to the module through a connector when the switch signal is active and that inhibits transfer of the voltage from the docking unit to the module when the switch signal is not active.

Advantageously, the present invention provides a system and method of connecting components that limits exposure to unsafe voltage levels, reduces potential electromagnetic emissions, and may provide lower cost through reduced complexity of connectors and signal lines.

DESCRIPTION OF THE FIGURES

In the figures.

DETAILED DESCRIPTION OF THE INVENTION

Figure 1:
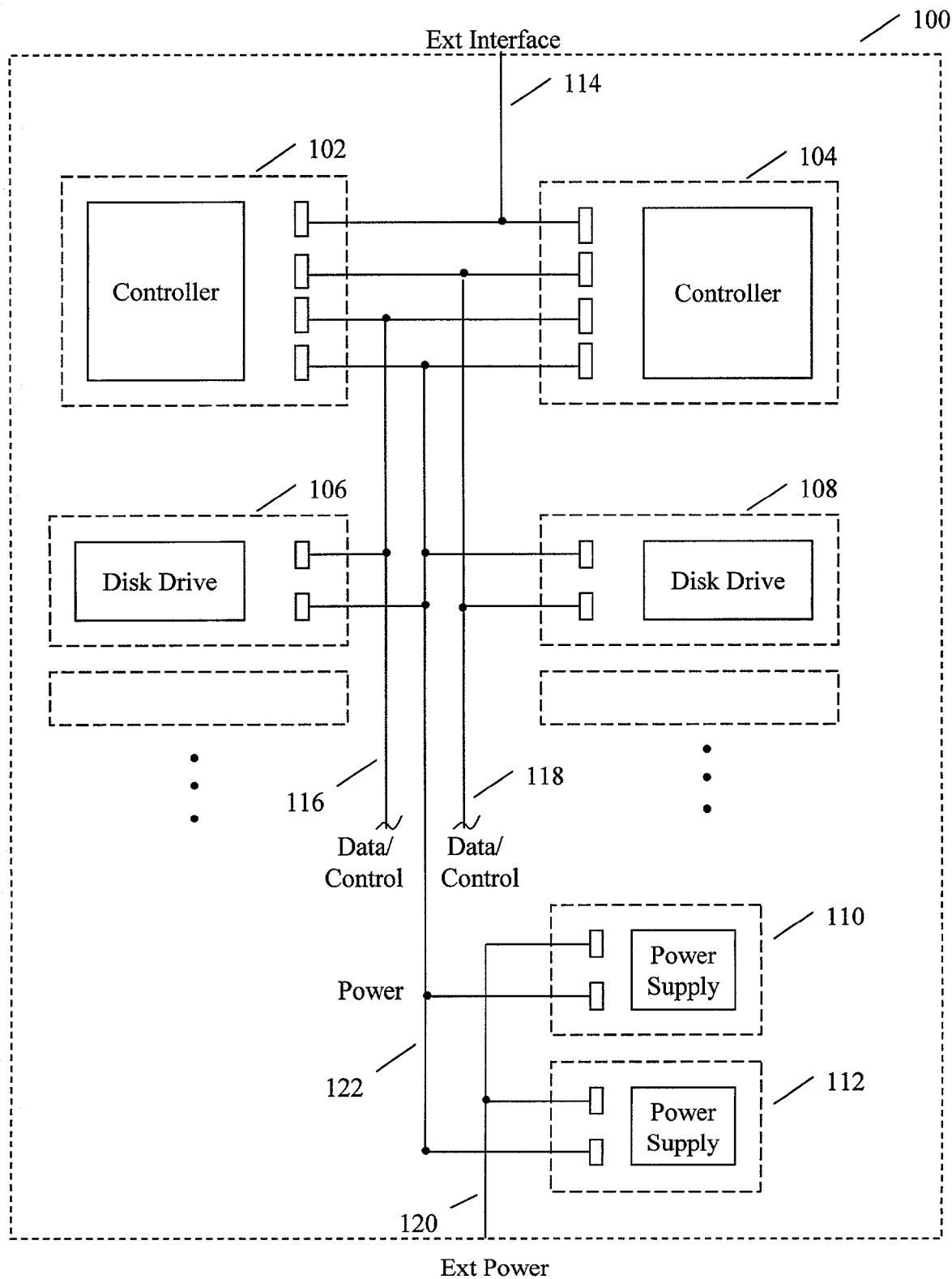
FIG. 1 is a depiction of a storage system.

FIG. 1 is a depiction of a storage system. Storage system 100 comprises controllers 102, 104, disk drive arrays 106, 108, and power supplies 110, 112. Power bus 122 provides power to the controllers and drive arrays. Controller 102 is connected to disk drive array 106 through a first data/control bus 116 and to disk drive array 108 through a second data/control bus 118. Controller 102 communicates data to an external system through external interface 114. This interface may comprise an Ethernet bus, SCSI (Small Computer Systems Interface) bus, fibre channel connection, or other type of interface, either serial or parallel. Similarly, controller 104 is connected to disk drive array 106 through first data/control bus 116 and to disk drive array 108 through second data/control bus 118. Controller 102 also communicates data to an external system through external interface 114. In some implementations, controller 102 and controller 104 may employ separate interfaces (not depicted) to communicate data to an external system. Controllers 102, 104 each employ one or more connectors to receive power from power bus 122 and to interface to first data/control bus 116, second data/control bus 118, and external interface 114. Disk drive arrays 106, 108 each employ one or more connectors to receive power from power bus 122 and to interface to first data/control bus 116 or second data/control bus 118. Although not depicted, in some implementations, disk drive arrays may interface to both first data/control bus 116 and second data/control bus 118. Power supplies 110 and 112 receive external power from external power bus 120. External power bus 120 may supply line voltages such as 120 volts AC or 240 volts AC as is common in North America, or may supply other voltages in different countries. Power supplies 110, 112 convert the line voltage of external power bus 120 to a voltage (or voltages) used by controllers 102, 104 and disk drive arrays 106, 108 and outputs the voltage (or voltages) on power bus 122. Some systems may employ redundant power buses (not depicted) such that a plurality of power buses are connected to each system component. System 100 may also include one or more ESMs (Environmental Service Monitor), not depicted, that provide monitoring of the system. Monitoring may include temperature, power supply voltages, cooling fan operating information and the like. The ESM or ESMs are typically interfaced to the controllers such that operating conditions may be conveyed to an external system. The system of FIG. 1 is illustrative of the components comprising a storage system. System architectures may vary with the size and capabilities of the system. Large system modules may comprise 'tray' architectures wherein a plurality of drives and one or more power supplies may be contained in a removable tray. The tray may further contain one or more ESMs and may contain one or more storage controllers. Other architectures may employ modules comprising one or more storage controllers and one or more power supplies. The present invention, as shall be later described in detail, is applicable to any architecture employing removable modules containing one or more system components. Power supplies may be internal to modules, external to modules as part of a cabinet, or may comprise a removable module.

Storage systems are typically modular in architecture such that failed components may be readily replaced or additional components added to repair or upgrade the system. The storage system may comprise a cabinet with slots or bays into which controller, disk drive and power supply modules may be installed. Connectors on each module provide an interface to power and/or data/control signals. Systems must comply with federal safety and electromagnetic emissions standards. Underwriters Laboratories (UL), headquartered in Northbrook Ill., typically certifies systems. UL imposes limitations on a user's exposure to unsafe voltage levels. Some architectures employ safety switches to limit exposure to unsafe voltages. However these switches typically switch high currents, resulting in potential contact damage and failure over time. Further, a hole may be employed in the module casing to allow activation of the switch, providing a potential leak for electromagnetic radiation. The present invention overcomes the aforementioned limitations by conveying a magnetic field through a non-ferrous surface, such as aluminum, for example, that activates a switch. The switch then may be used to control a power switching device.

Figure 2:
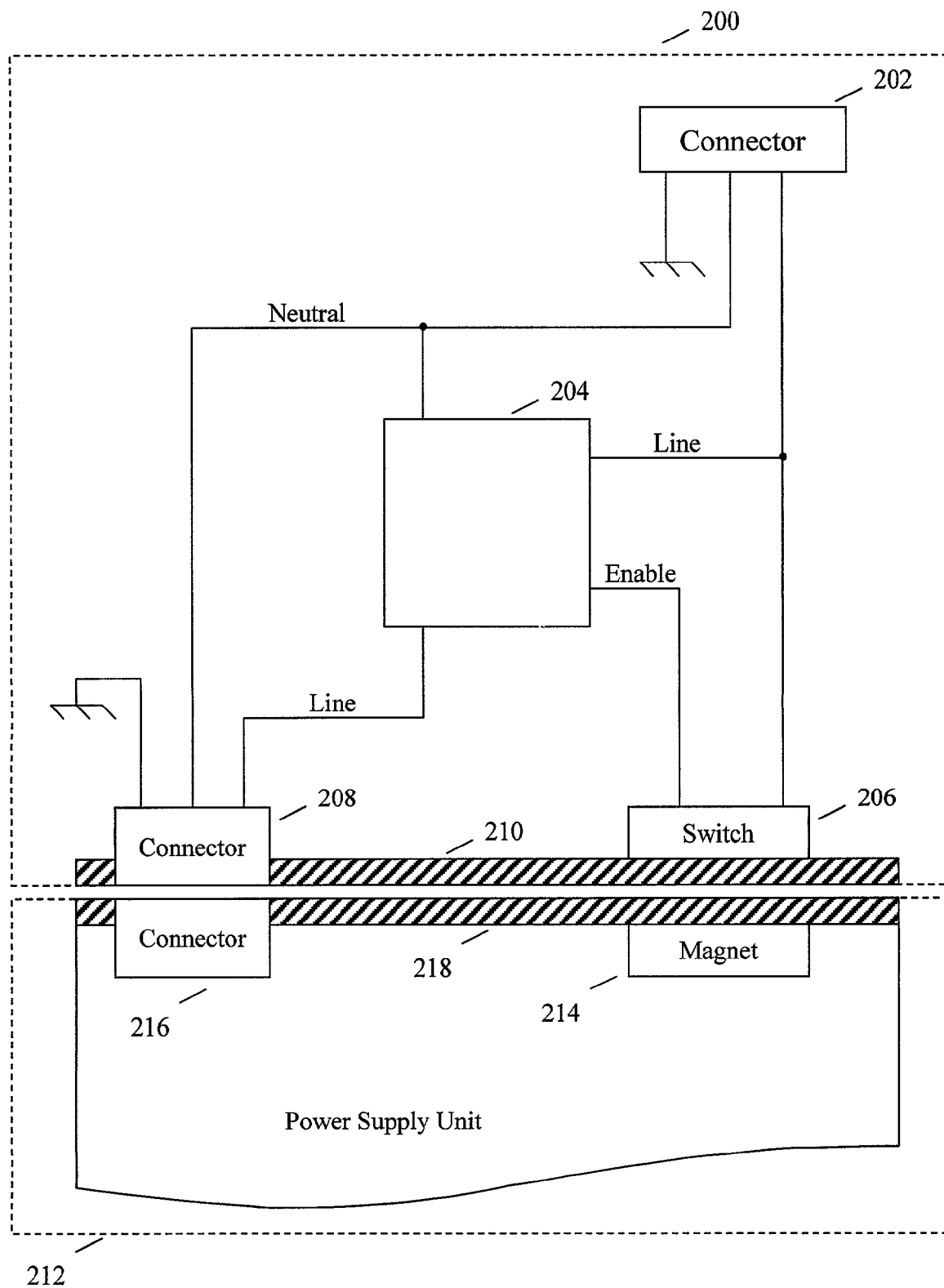
FIG. 2 depicts a magnetic proximity controlled power interface.

FIG. 2 illustrates a magnetic proximity controlled power interface. Docking unit 200 comprises connector 202, power switching device 204, switch 206, connector 208 and bulkhead 210. An opening in bulkhead 210 allows access to connector 208. Switch 208 is disposed on or near the surface of bulkhead 210. Power supply unit 212 comprises magnet 214, connector 216 and bulkhead 218. An opening in bulkhead 218 allows access to connector 216. Magnet 214 is affixed to bulkhead 218. The term affixed is defined to mean that the magnet 214 may be on or near an inner surface of bulkhead 218, in an opening in bulkhead 218, or on or near an exterior surface of bulkhead 218, as shall be later illustrated in FIG. 6. In operation, power supply unit 212 is positioned such that connector 216 is opposite but separated from connector 208 and magnet 206 is opposite but separated from switch 206. Power supply unit 212 is moved toward docking unit 200 and conductors of connector 216 make contact with conductors of connector 208 prior to activation of switch 206 by magnet 214. The power supply unit is then moved toward docking unit 200 until connectors 208 and 216 are mated and switch 206 is activated by magnet 214. Once switch 206 is activated, an enable signal is transferred to power switching device 204. Switch 206 may comprise a reed switch from Hamlin, a subsidiary of Breed Technologies headquartered in Lakeland Fla. A reed switch has two ferromagnetic reeds that are hermetically sealed into a glass capsule that may contain inert gases or a vacuum. The reeds overlap and are separated by a small gap in the contact area. Contact surfaces may be precious metal, semiprecious metal or mercury wetted. In the presence of a magnetic field the reeds close and open again when the magnetic field is removed. Power switching device 204 may comprise a relay, a solid-state relay, silicon controlled rectifiers or other power switching devices. Some solid-state relays accept line voltage as a control input, such as those from Potter & Brumfield (a subsidiary of Tyco International Ltd., headquartered in Pembroke, Bermuda.), simplifying the number of components required and reducing the likelihood of failure. The enable signal from switch 206 causes power switching device 204 to transfer power from connector 202 to connector 208, providing line voltage to power supply unit 212. Power supply unit 212 typically supplies other voltages to unit 200 that may be conveyed through connector 216 or another connector. Power supply unit 212 may be constructed such that upon receiving power from connector 216, output voltages are ramped to their fall value to reduce spiking. Further, Power supply unit 212 may receive a current signal from another power supply, as may be conveyed through connector 216, which may be employed to balance the load between the supplies. Advantageously, the magnetically controlled interface of FIG. 2 allows docking unit power connectors to be at or near to ground potential when a power supply unit is not installed, reducing shock hazards and possible electromagnetic radiation when a module is not installed. As such the configuration and maintenance of modular systems may be performed in greater safety and convenience. Further, the present invention may be employed to ramp power to an installed module, reducing possible spikes or surges in power signals and reducing possible stress to circuitry. This may result in greater system reliability and operating longevity.

Figure 3:
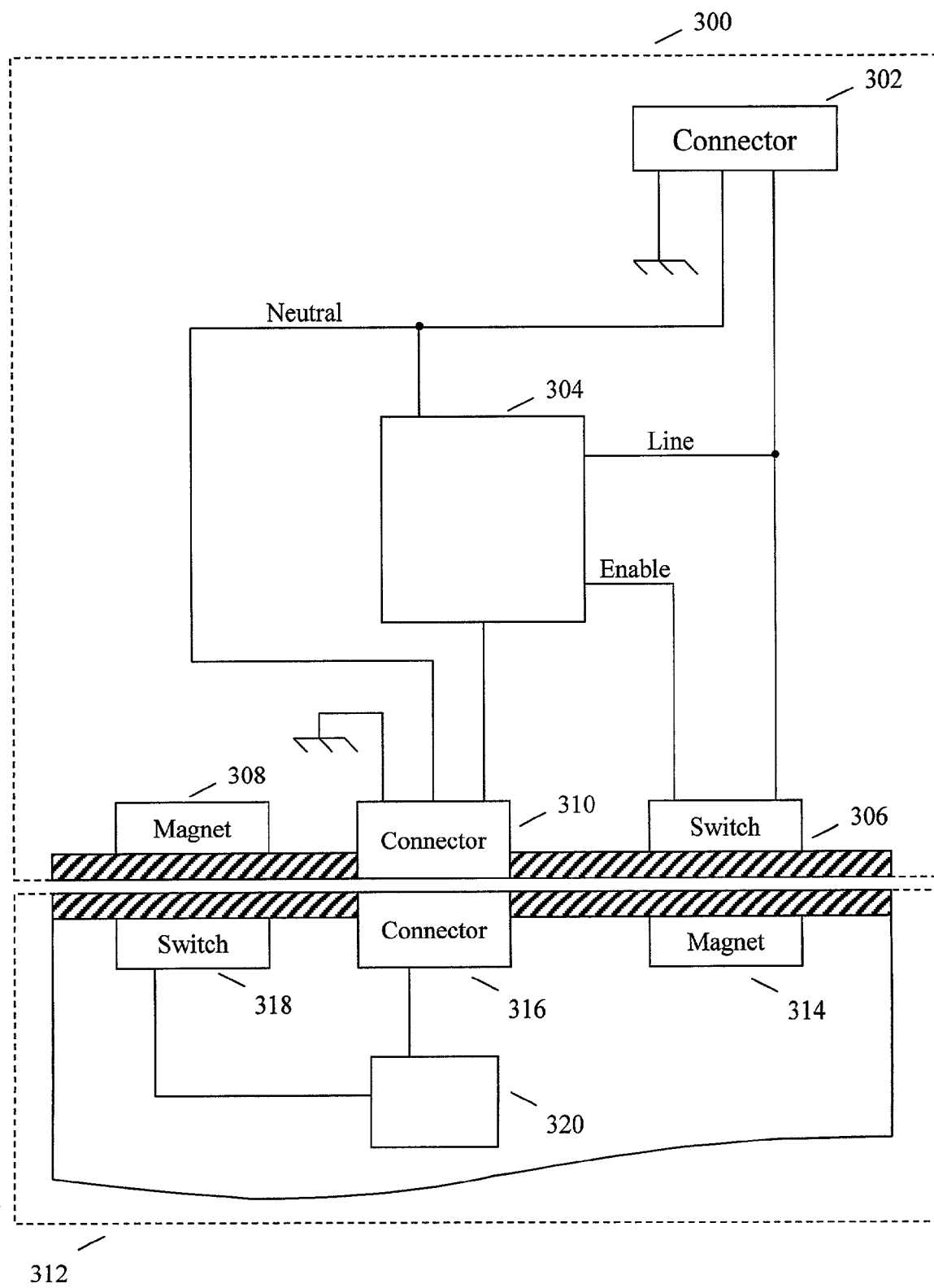
FIG. 3 depicts a magnetic proximity controller power interface employing two switches.

FIG. 3 depicts a magnetic proximity controller power interface employing two switches. While similar to FIG. 2, the interface of FIG. 3 adds magnet 308 to docking unit 300 and also adds switch 318 and power control 320 to power supply unit 312. Switch 318 is closed when the power supply unit 312 is docked to docking unit 300. When power supply unit 312 is removed, there exists a position where connector 316 is in contact with connector 310 but switch 318 is open. When this occurs, power control 320 may be employed to ramp voltages down, reducing spiking and placing a sudden increase in load on other power supplies in the system.

Figure 4:
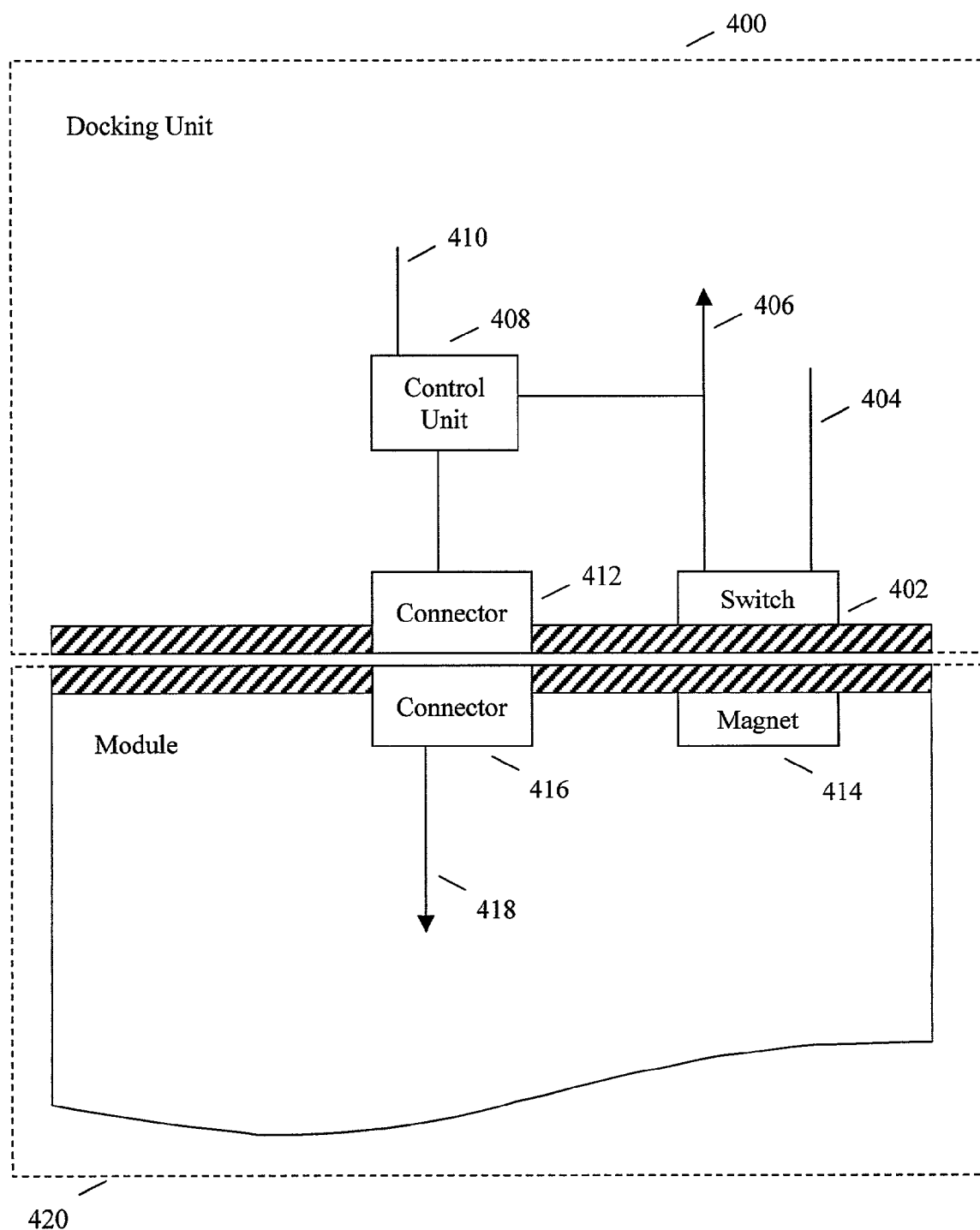
FIG. 4 depicts a magnetic proximity controlled interface for a disk drive or controller.

The present invention may also be employed with disk and controller modules wherein the power to the modules may be ramped in order to limit surge current. FIG. 4 depicts a magnetic proximity controlled interface for a disk drive, controller, or other module. Docking unit 400 comprises switch 402, switch supply line 404, switch output line 406, control unit 408, power supply line 410 and connector 412. Module 420 comprises magnet 414, connector 416 and module power line 418. When module 420 is docked to docking unit 400, magnet 414 activates switch 402, providing transfer of switch supply line 404 voltage to switch output line 406. The voltage supplied by switch supply line 404 is a sufficient to activate or provide an indication to control unit 408 and may comprise a wide range of voltages. Switch output line 406 serves as an input signal to control unit 408. Switch output line 406 may also be used to provide an indication that module 420 is docked. Control unit 408 transfers power from power supply line 410 to connector 412. Such transfer may include ramping voltages when a voltage is detected on switch output line 406. In such a manner, spikes and surge current may be reduced. Control unit 408 may also be employed to enable and disable driving of data and control signals to module 420. As such, the present invention may be employed to control interfaces for both power and data and control signals. By not driving data and control signals when a module is not present, electromagnetic radiation may be reduced. This may also result in higher system reliability since an unused connector, even if contaminated with dirt, dust, and foreign objects, will not affect operation of the system.

Figure 5:
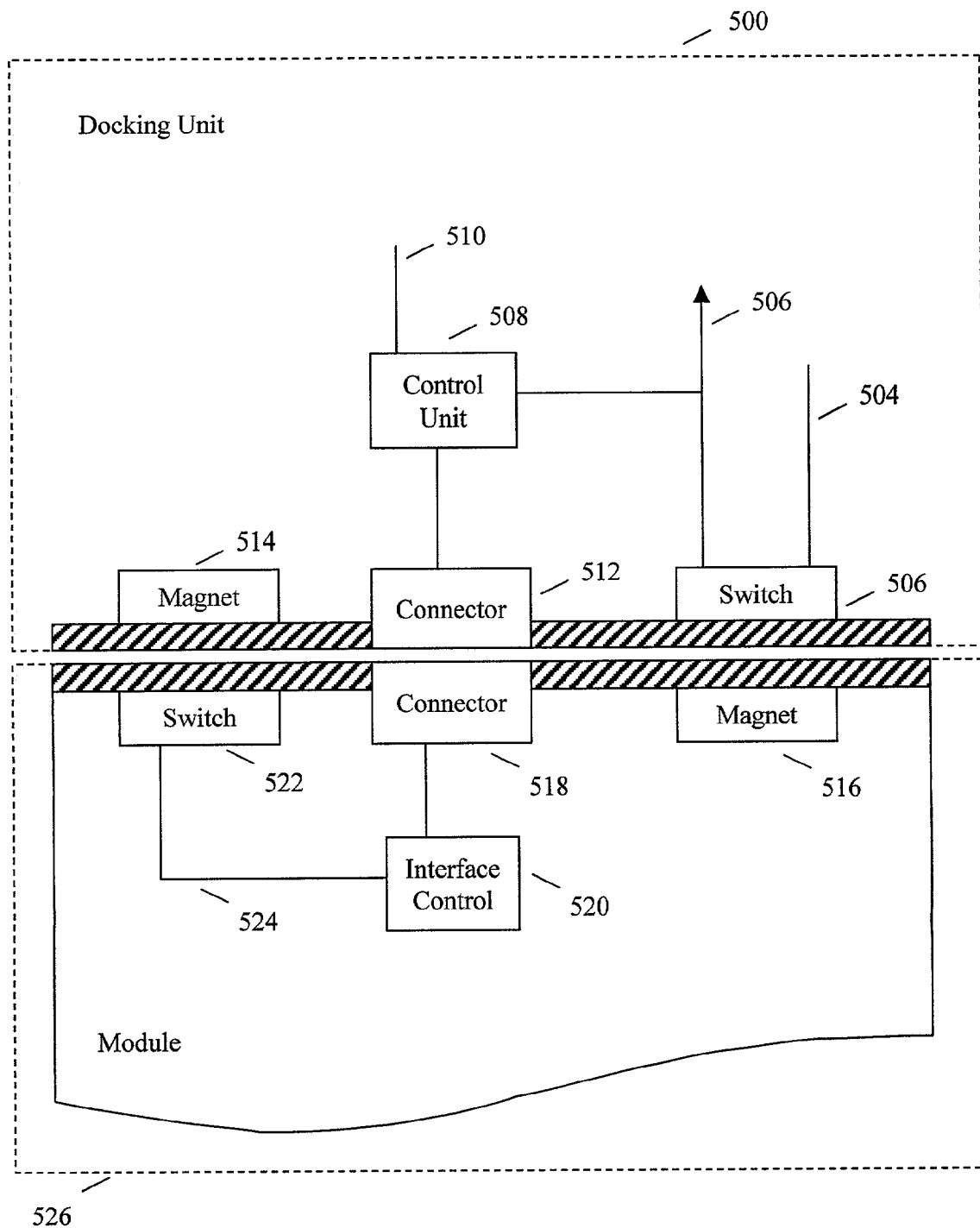
FIG. 5 depicts a magnetic proximity controlled interface for a disk drive, controller, or other module employing two switches.

FIG. 5 depicts a magnetic proximity controlled interface for a disk drive, controller, or other module employing two switches. As in FIG. 4, the system of FIG. 5 employs magnet 516 disposed in module 526 to activate switch 506 disposed in docking unit 500. Switch output line 506 is employed to signal control unit 508 and may be employed to provide an indication that module 526 is docked. As in FIG. 4, control unit 508 is responsive to switch output signal 506 and may connect power supply line 510 to connector 512 and may ramp voltages in response to a transition of switch output line 506. Further, control unit 508 may enable data and control lines in response to switch output line 506. Docking unit 500 also includes magnet 514 that communicates with switch 522 disposed in module 526. Switch 522 is activated as module 526 is docked with docking unit 500 and is deactivated when module 526 is undocked from docking unit 500. When module 526 is being undocked, switch 522 may be deactivated prior to the breaking of a connection between connector 512 and connector 518. Switch output line 524 indicates to interface control 520 that the switch is deactivated. Interface control 520 may place data and control signals in a high impedance state in response to the deactivation of switch 522. This may reduce noise on data and control lines when the connection between connector 512 and connector 518 is broken.

Figure 6:
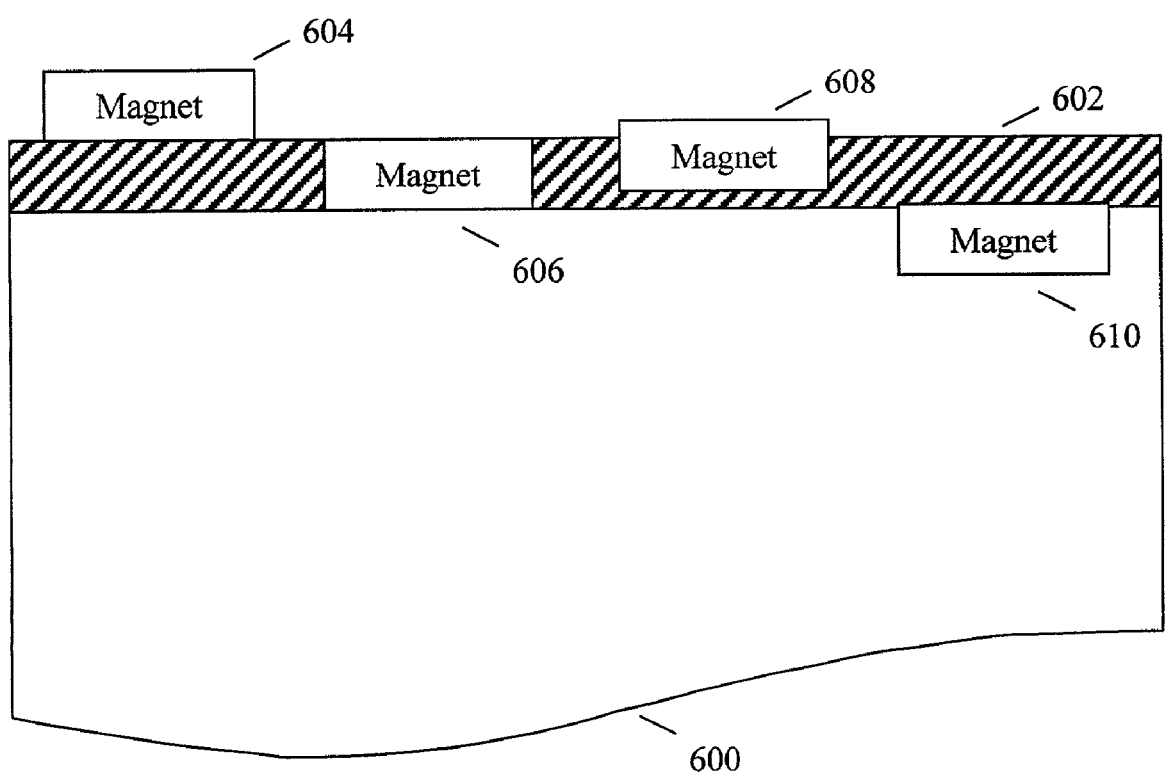
FIG. 6 depicts magnet placement.

The magnet or magnets employed with the present invention may be disposed on an outer surface of a module or docking unit, in the bulkhead of a module or docking unit, or may be disposed interior to the docking unit or module. FIG. 6 depicts magnet placement. Unit 600 may be a docking unit or module comprising bulkhead 602. A magnet may be placed external to the unit as shown for magnet 604. A magnet may be placed in an opening in bulkhead 602 as shown by magnet 606. Magnet 606 may be disposed in a carrier made of a non-magnetic material, such as aluminum, for example, limiting electromagnetic emissions. A magnet may be disposed in a cavity in bulkhead 602 as shown by magnet 608. Magnet 608 may be flush with the outer surface of bulkhead 602. A magnet may be placed on the interior of unit 600 as shown by magnet 610. When magnet 610 is placed on the interior of bulkhead 602, a portion of bulkhead 602 is comprised of a non-magnetic material, such as aluminum, for example. Further, the area of bulkhead 602 in which a magnet is positioned may be of different thickness than other areas of bulkhead 602. The present invention may employ some or all of the magnet placements depicted in FIG. 6 and may employ a carrier of non-magnetic material. Although previous figures depict interior positioning of magnets, the teaching of FIG. 6 may be applied to these figures such that magnets may be placed interior, in or through a bulkhead, or exterior to a docking unit or module.

The present invention may be employed with module to docking unit connections, docking unit to docking unit connections, or module-to-module connections wherein modules may connect with other modules and may be cascaded or otherwise interconnected. The term bulkhead may be employed to refer to a surface of a docking unit or module. The present invention provides a new system and method for interfacing electrical and electronic components that limits exposure to unsafe voltages, reduces electromagnetic radiation by reducing the number of openings needed in a docking unit or module, and by placing data and control signals in a high impedance state when a module is not present. The present invention also reduces the number of pins required in connectors by employing the magnetic proximity controller interface to signal that a module is present rather than employing a signal pin in the connector. This results in less costly connectors and eliminates a possible point of failure. The present invention may also be employed to control an interface when a module is removed. A magnetic proximity sensor in a module may be employed to sense removal prior to an electrical connection at a connector being broken, allowing the module to place signals in a state such that spikes do not occur or are reduced when the connection is broken. Advantageously, the present invention provides a system and method for interfacing module components that offers safety, reduced electromagnetic radiation and reduced stress to circuitry.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

I claim:

1. In an array of independent discs, an electrical connection system comprising:

a cabinet including at least one docking unit;

a module that may be docked to said docking unit;

a first surface of said docking unit that does not have a magnet attached thereto;

a first magnet affixed to a second surface of said module;

a first switch positioned on said first surface of said docking unit;

a first circuit that receives a first switch signal from said first switch and transfers a voltage from said docking unit to said module through a connector when said first switch signal is active and that inhibits transfer of said voltage from said docking unit to said module when said first switch signal is not active;

a first surface of said module that does not have a magnet attached thereto;

a second magnet affixed to a second surface of said docking unit;

a second switch positioned on said first surface of said module; and a second circuit that receives a second switch signal from said second switch and that enables said module to drive data signals to said docking unit when said second switch signal is active.

2. The system of claim 1 further comprising:

an indicator signal derived from said first switch signal that indicates the presence of said module.

3. The system of claim 1 wherein said first circuit ramps said voltage supplied to said module.

4. The system of claim 1 wherein said module supplies a second voltage to said docking unit.

5. The system of claim 1 wherein said module is a storage controller module.

6. The system of claim 1 wherein said module is a disk drive module.

7. The system of claim 1 wherein said first circuit enables said docking unit to drive data signals to said module.

* * * * *